United States Patent
Briesch et al.

(10) Patent No.: US 8,075,646 B2
(45) Date of Patent: Dec. 13, 2011

(54) ADVANCED ASU AND HRSG INTEGRATION FOR IMPROVED INTEGRATED GASIFICATION COMBINED CYCLE EFFICIENCY

(75) Inventors: Michael S. Briesch, Orlando, FL (US); Philip G. Deen, Enterprise, FL (US); Terrence B. Sullivan, Orlando, FL (US)

(73) Assignee: Siemens Energy, Inc., Orlando, FL (US)

(*) Notice: Subject to any disclaimer, the term of this patent is extended or adjusted under 35 U.S.C. 154(b) by 1045 days.

(21) Appl. No.: 11/350,568

(22) Filed: Feb. 9, 2006

(65) Prior Publication Data
US 2007/0180768 A1  Aug. 9, 2007

(51) Int. Cl.
*C10J 3/46* (2006.01)
(52) U.S. Cl. ............................ 48/210; 48/197 FM
(58) Field of Classification Search ............ 48/197 R
See application file for complete search history.

(56) References Cited

U.S. PATENT DOCUMENTS

| | | | |
|---|---|---|---|
| 4,806,136 A | 2/1989 | Kiersz et al. | |
| 5,076,837 A * | 12/1991 | Rathbone et al. | 75/433 |
| 5,224,336 A | 7/1993 | Agrawal et al. | |
| 5,722,259 A | 3/1998 | Sorensen et al. | |
| 5,865,023 A | 2/1999 | Sorensen et al. | |
| 5,979,183 A | 11/1999 | Smith et al. | |
| 6,173,563 B1 | 1/2001 | Vakil et al. | |
| 6,220,013 B1 | 4/2001 | Smith | |
| 6,397,575 B2 | 6/2002 | Tomlinson et al. | |
| 6,588,212 B1 * | 7/2003 | Wallace et al. | 60/772 |
| 6,871,502 B2 | 3/2005 | Marin et al. | |
| 6,877,322 B2 | 4/2005 | Fan | |
| 2003/0041518 A1 | 3/2003 | Wallace et al. | |
| 2003/0083391 A1 | 5/2003 | Jahnke et al. | |
| 2003/0119919 A1 | 6/2003 | Allam et al. | |
| 2003/0181314 A1 | 9/2003 | Kranz | |
| 2003/0182944 A1 | 10/2003 | Hoffman et al. | |
| 2004/0031256 A1 | 2/2004 | Rollins, III | |

FOREIGN PATENT DOCUMENTS

| | | |
|---|---|---|
| GB | 2075124 A | 11/1981 |
| JP | 57083636 A | 5/1982 |

* cited by examiner

*Primary Examiner* — Alexa Neckel
*Assistant Examiner* — Imran Akram (57) ABSTRACT

A system and method for increasing the efficiency and/or power produced by an integrated gasification combined cycle system by increasing the integration between the air separation unit island, the heat recovery steam generator and the remainder of the system. By integrating heat produced by the heat recovery steam generator in the remainder of the integrated gasification combined cycle system, heat may be utilized that may have otherwise been lost or used further downstream in the system. The integration helps to increase the efficiency of the combustion reaction and/or the gasification reaction used to produce the syngas utilized in the integrated gasification combined cycle system.

5 Claims, 6 Drawing Sheets

ADVANCED ASU AND HRSG INTEGRATION FOR IMPROVED INTEGRATED GASIFICATION COMBINED CYCLE EFFICIENCY

FIELD OF THE INVENTION

The present invention is directed generally to gas turbine systems, and more particularly to integrated gasification combined cycle gas turbine systems.

BACKGROUND OF THE INVENTION

The utilization of coal in the prior art has been minimized due to undesirable emissions, such as oxides of nitrogen and sulfur, particulate emissions and greenhouse gases such as carbon dioxide. As a result, there have been efforts to reduce these emissions and improve fuel efficiency of coal plants.

One of the systems that have been developed is the Integrated Gasification Combined Cycle (IGCC) system for use in power generation. IGCC systems were devised as a way to use coal as the source of fuel in a gas turbine plant. IGCC systems are clean and generally more efficient than prior art coal plants.

IGCC is a combination of two systems. The first system is coal gasification, which uses coal to create a clean-burning synthetic gas ("syngas"). The gasification portion of the IGCC plant produces syngas, which may then be used to fuel a combustion turbine. Coal is combined with oxygen in a gasifier to produce the syngas, hydrogen and carbon monoxide. The syngas may then be cleaned by a gas cleanup process. After cleaning, the syngas may be used in the combustion turbine to produce electricity.

The second system is a combined-cycle, or power cycle, which is an efficient method of producing electricity commercially. A combined cycle includes a combustion turbine/generator, a heat recovery steam generator (HRSG), and a steam turbine/generator. The exhaust heat from the combustion turbine may be recovered in the HRSG to produce steam. This steam then passes through a steam turbine to power another generator, which produces more electricity. A combined cycle is generally more efficient than conventional power generating systems because it re-uses waste heat to produce more electricity.

IGCC systems offer several advantages over current conventional coal-based power generation systems. One advantage is reduced emissions. Another aspect of IGCC plants is that emissions clean-up, including removal of sulfur and carbon dioxide, may be effected upstream of the combustor system in the fuel stream. Since this stream is far smaller than the entire flue gas stream, emissions removal equipment for an IGCC plant are lower than for a conventional coal plant of like output.

IGCC systems offer other advantages, such as higher efficiency, less coal used, higher turbine outputs, and/or the production of additional chemical by-products, such as hydrogen, which may be used as an alternative source of energy in other developing technologies.

Nevertheless, IGCC systems may still suffer from reduced efficiencies as compared to other systems. Since syngas has a lower heating value than other fuels, more syngas is needed to produce a selected turbine temperature. In addition, the product nitrogen stream from the Air Separation Unit (ASU) Island of an Integrated Gasification Combined Cycle (IGCC) plant may be at elevated temperatures, which might involve the use of equipment for reducing the heat.

Accordingly, it would be beneficial to provide a system that utilizes coal that has increased efficiencies as compared to prior art systems. It would also be beneficial to increase the integration of the components in the IGCC to increase efficiency and/or power out put of the IGCC systems.

SUMMARY OF THE INVENTION

This present invention provides a method of increasing the efficiency and/or power produced by an integrated gasification combined cycle system by increasing the integration between the air separation unit island, the heat recovery steam generator and the remainder of the system. By integrating heat available in the heat recovery steam generator in the remainder of the integrated gasification combined cycle system, heat may be utilized that may have otherwise been lost or used further downstream in the system. The integration helps to increase the efficiency of the combustion reaction and/or the gasification reaction used to produce the syngas utilized in the integrated gasification combined cycle system.

In particular, in one aspect, the present invention provides a method for increasing efficiency of an integrated gasification combined cycle system including the steps of producing a nitrogen gas product stream and an oxygen gas product stream using an air separation unit, feeding the oxygen gas product stream to a gasifier, producing a syngas stream in the gasifier using the oxygen gas product stream and coal, forming a fuel mixture stream using the syngas stream, and heating at least a portion of at least one of the oxygen gas product stream, nitrogen gas product stream, the fuel mixture stream, or both using heat from a heated regenerative steam generator.

In another aspect, the present invention provides a system for increasing efficiency of an integrated gasification combined cycle system including an air separation unit for producing a nitrogen gas product stream and an oxygen gas product stream, a gasifier for producing a syngas stream in the gasifier using the oxygen gas product stream and coal, a mixing valve for forming a fuel mixture stream using the syngas stream and at least a portion of the nitrogen gas product stream, and a heated regenerative steam generator for providing heat for heating at least one of the oxygen gas product stream, the nitrogen gas product stream, the fuel mixture stream, or both.

These and other embodiments are described in more detail below.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a method for increasing the efficiency of an integrated gasification combined cycle (IGCC) gas turbine system and an IGCC having increased efficiency. The present invention accomplishes the improved efficiency of the system by increasing the integration between the IGCC and the heat recovery steam generator (HRSG) and air separation unit (ASU) portions of the IGCC. In the present invention, heat from one area of the system is transferred and/or used in another area of the system to increase the overall efficiency of the system.

In one embodiment of the present invention, the improved systems and methods integrate heat from the HRSG either directly or through the use of one or more product gases from the ASU as part of a method for transferring heat in the IGCC system upstream. For example, in one embodiment, superheated steam from the HRSG may be used to heat the fuel mixture entering the combustor and/or heat the reaction products used in the gasifier. In these embodiments, the increased heat increases the efficiency of the respective processes. Alternatively, one or more product gases of the ASU may be heated by the HRSG and this heated product gas may then be used to heat the fuel mixture entering the combustor and/or heat the oxygen gas stream used in the gasifier. Since the excess heat is used upstream, the system operates at higher efficiencies than prior art systems since the amount of sygnas is increased and/or the efficiency of the turbine is increased, thereby increasing the amount of power produced.

Figure 1:
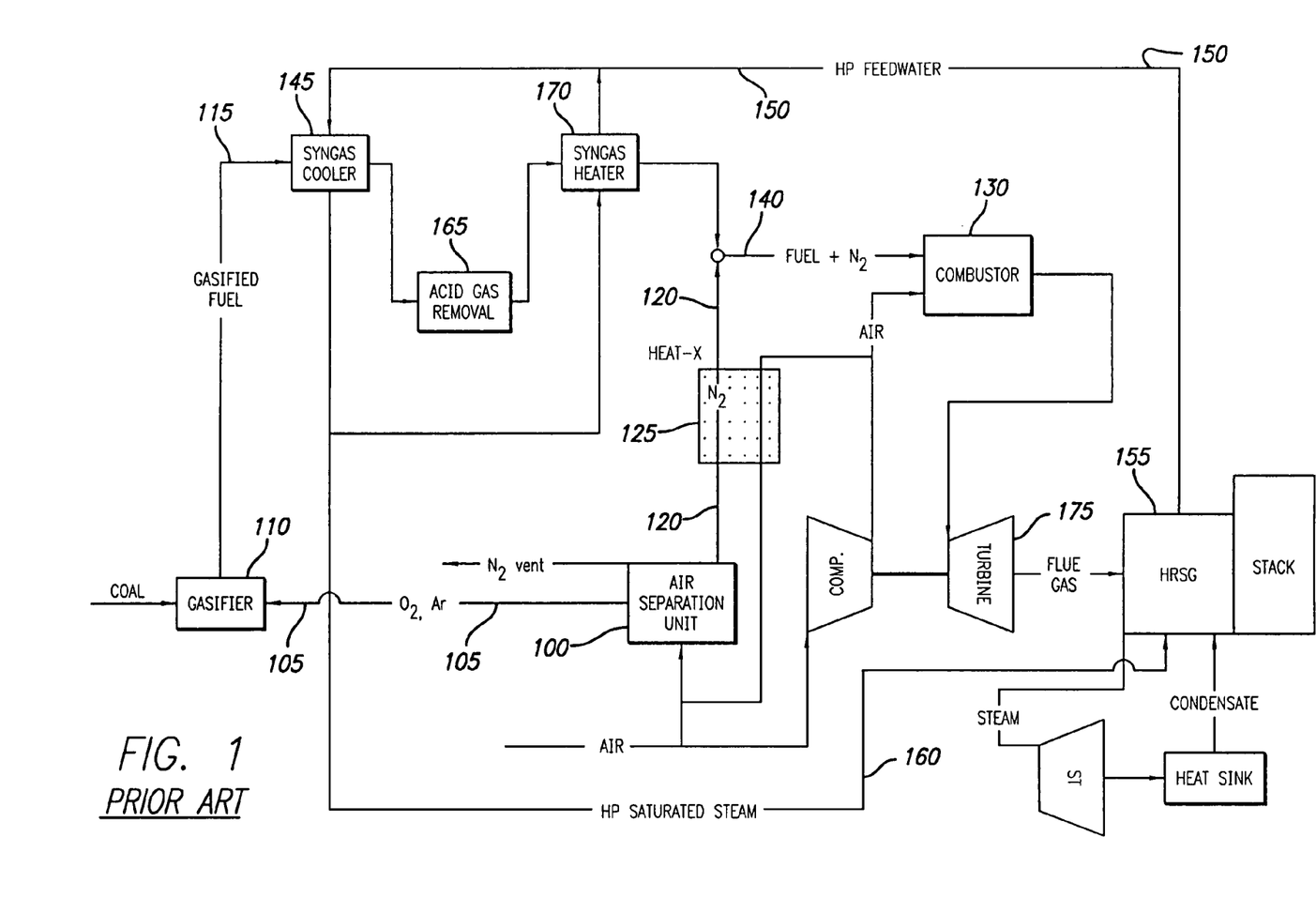
FIG. 1 shows a schematic of a standard IGCC system.

In a standard IGCC system, with reference to FIG. 1, the IGCC system includes an ASU 100, which produces an oxygen gas product stream 105 and a nitrogen gas product stream 120. The gasifier 110 produces a synthetic gas ("syngas") product stream 115, which may then be used as the fuel source for the combustor 130. The ASU 100, which may be a cryogenic ASU, is used to provide pure or substantially pure oxygen to the gasification reactor and, in alternative embodiments, may include a post-compression air bleed from the gas turbine 175. The ASU 100 produces the oxygen gas product stream 105 and the nitrogen gas product stream 120, which are generally below the temperatures of other streams in the IGCC system, such as the syngas stream 115. As a result, in certain embodiments of the present invention, these streams may be used to transfer heat from the HRSG 155 to one or more other areas of the IGCC wherein the increased temperatures help to increase the efficiency of overall system.

Alternatively, or in addition thereto, heat from the HRSG 155 may be used to increase the temperature of the fuel mixture 140 entering the combustor 130 and/or the oxygen gas product stream 105 entering the gasifier. The HRSG 155 typically uses a feedwater stream 150 and heat from the gas turbine 175 to produce a superheated steam that is used to produce power using a steam turbine. By transferring some of this heat upstream, however, the methods of the present invention increase the overall efficiency of the system by using this heat further upstream, such as in the gasifier and/or the combustor.

A standard IGCC may also include an acid gas removal stage 165 since the syngas from the gasifier is generally cleaned before it is used as a gas turbine fuel. The cleanup process typically involves removing sulfur compounds, ammonia, metals, alkalytes, ash, and/or particulates to meet the gas turbine's fuel gas specifications. The syngas may then be heated in a syngas heater 170 before being used in the combustor 130. In addition, the nitrogen gas product stream 120, if used to dilute the fuel mixture 140, may first be passed through a heat exchanger 125 which is used to heat the nitrogen stream 120 since the product streams from the ASU 100 are typically at cooler temperatures because most air separation process are performed at sub-zero temperatures.

Accordingly, by using heat from the HRSG and/or one or more product streams from the ASU, the present invention increases the overall efficiency of the IGCC system by increasing the amount of syngas created and/or by increasing the temperature of the fuel mixture. These concepts may be accomplished using a variety of embodiments.

In one embodiment, product nitrogen ($N_2$) generated from the ASU is routed to the HRSG where it is heated by the gas turbine exhaust gas. After leaving this heat exchanger, the heated nitrogen-gas product stream may be routed to another heat exchanger where it transfers heat to the syngas fuel. Upon leaving the heat exchanger, the nitrogen is then returned to the HRSG and heated in yet another heat exchanger. Upon exiting this heat exchanger, it is mixed with the fuel stream and then enters the combustor of the gas turbine.

Figure 2:
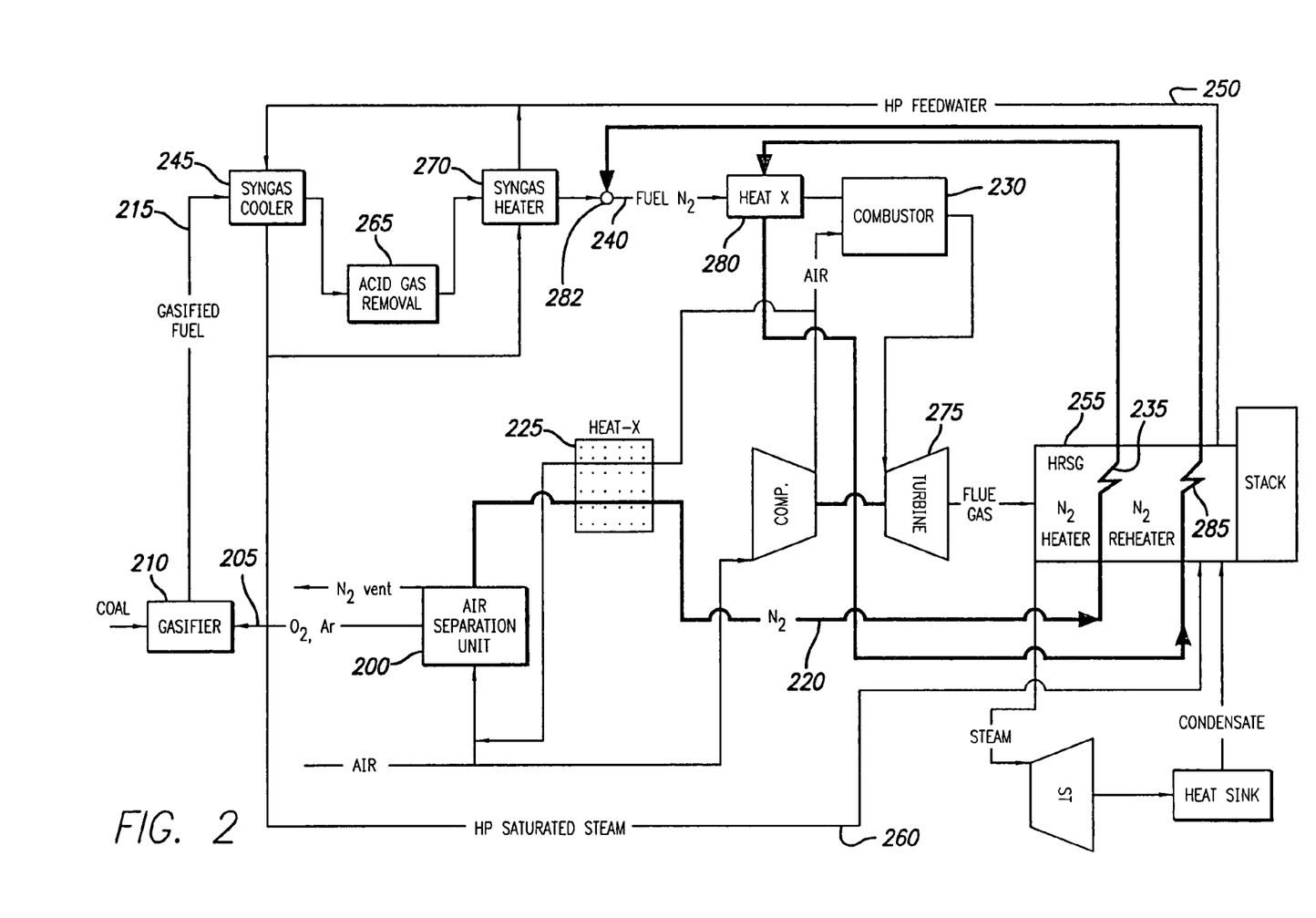
FIG. 2 shows a schematic of an IGCC system according to one embodiment of the present invention.

FIG. 2 provides a schematic of this embodiment. As shown, the ASU 200 includes an oxygen gas product stream 205 that may be sent to the gasifier 210 for use in forming the syngas product stream 215. The nitrogen product gas stream 220 from the ASU 200 may then be passed through a heat exchanger 225 to heat the nitrogen gas 220. Instead of then being mixed with the syngas just prior to being fed into the combustor 230, this embodiment diverts all or a part of the nitrogen gas stream 220 to a first nitrogen heater 235, which is located in the HRSG 255, wherein heat from the turbine 275 may be transferred to the nitrogen gas 220. The heated nitrogen flow may then be passed through a heat exchanger 280 to increase the temperature of the fuel mixture 240 entering the combustor 230. The nitrogen gas stream 220 may then be sent to a second nitrogen heater 285 within the HRSG 255 and then mixed with the heated syngas, such as with a mixing valve, to form the fuel mixture 240 that then enters the combustor 230. This embodiment may also include a syngas cooler 245, which uses feedwater 250 from the HRSG 255 to form steam 260 that may be used to generate power in the HRSG; an acid gas removal stage 265; and a syngas heater 270. Combustion products from the combustor 230 may be sent to gas turbine 275 to produce power, and since the temperature of the fuel mixture 240 is higher, the temperature of the combustion products is higher, thereby producing more power in the turbine.

FIG. 2 shows all of the ASU product nitrogen gas being routed through the heat exchanger system; however, it is also possible that only a fraction of the product nitrogen may be routed in this manner. In addition, in FIG. 2, the heat exchanger 280 is depicted as downstream of the nitrogen fuel mixing point 282; however, this heat exchanger could also be upstream of the mixing point.

In an alternative embodiment, product nitrogen ($N_2$) gas generated from the ASU is routed to the HRSG where it is heated by the gas turbine exhaust gas. After leaving this heat exchanger, the heated nitrogen is mixed with the fuel stream and then enters the combustor of the gas turbine.

Figure 3:
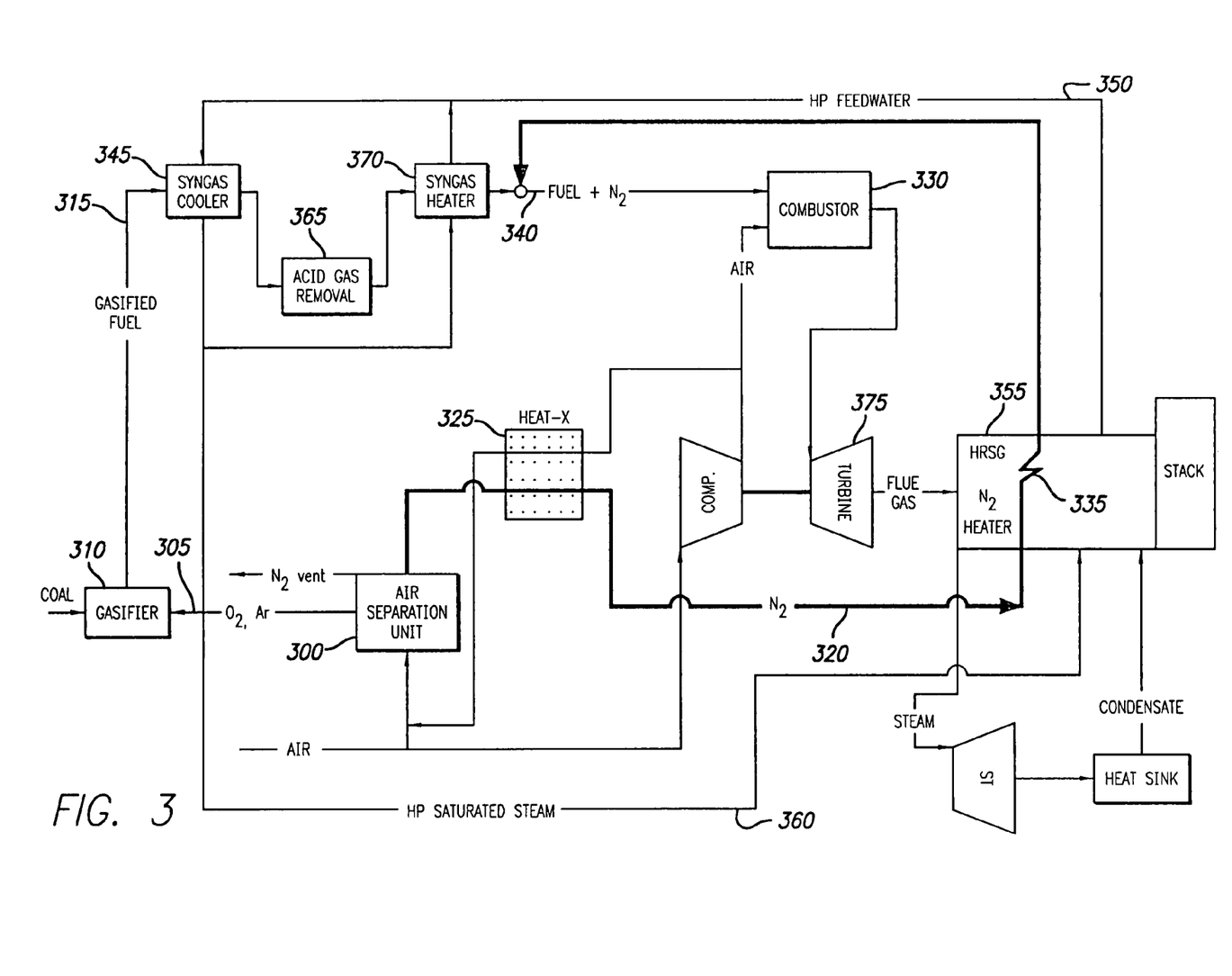
FIG. 3 shows a schematic of an IGCC system according to another embodiment of the present invention.

FIG. 3 provides a schematic of this embodiment. As shown, the ASU 300 includes an oxygen gas product stream 305 that may be sent to the gasifier 310 for use in forming the syngas product stream 315. The nitrogen product gas stream 320 from the ASU 300 may then be passed through a heat exchanger 325 to heat the nitrogen gas 320. Instead of then being mixed with the syngas just prior to being fed into the combustor 330, this embodiment diverts all or a part of the nitrogen gas stream 320 to be heated by the HRSG 355 using a nitrogen heat exchanger 335. The heated nitrogen stream may then be mixed with the syngas stream 315, such as through the use of a mixing valve, to form a fuel mixture 340 prior to being combusted in the combustor 330. This embodiment may also include a syngas cooler 345, which uses feedwater 350 from the HRSG 355 to form steam 360 that may be used to generate power in the HRSG; an acid gas removal stage 365; and a syngas heater 370. Combustion products from the combustor 330 may be sent to gas turbine 375 to produce power. In addition, FIG. 3 shows all of the ASU nitrogen product gas 320 being routed through the heat exchanger 335; however, it is also possible that only a fraction of the product nitrogen could be routed in this manner.

In yet another alternative embodiment, product nitrogen generated from the ASU is routed to the HRSG where it is heated by the gas turbine exhaust gas. After leaving this heat exchanger, the heated nitrogen gas may be routed to an oxygen heat exchanger wherein heat is transferred to the ASU product oxygen stream prior to being used in the gasifier. The nitrogen stream may then be routed back to the HRSG where it is reheated before mixing with the fuel stream that enters the combustor of the gas turbine.

Figure 4:
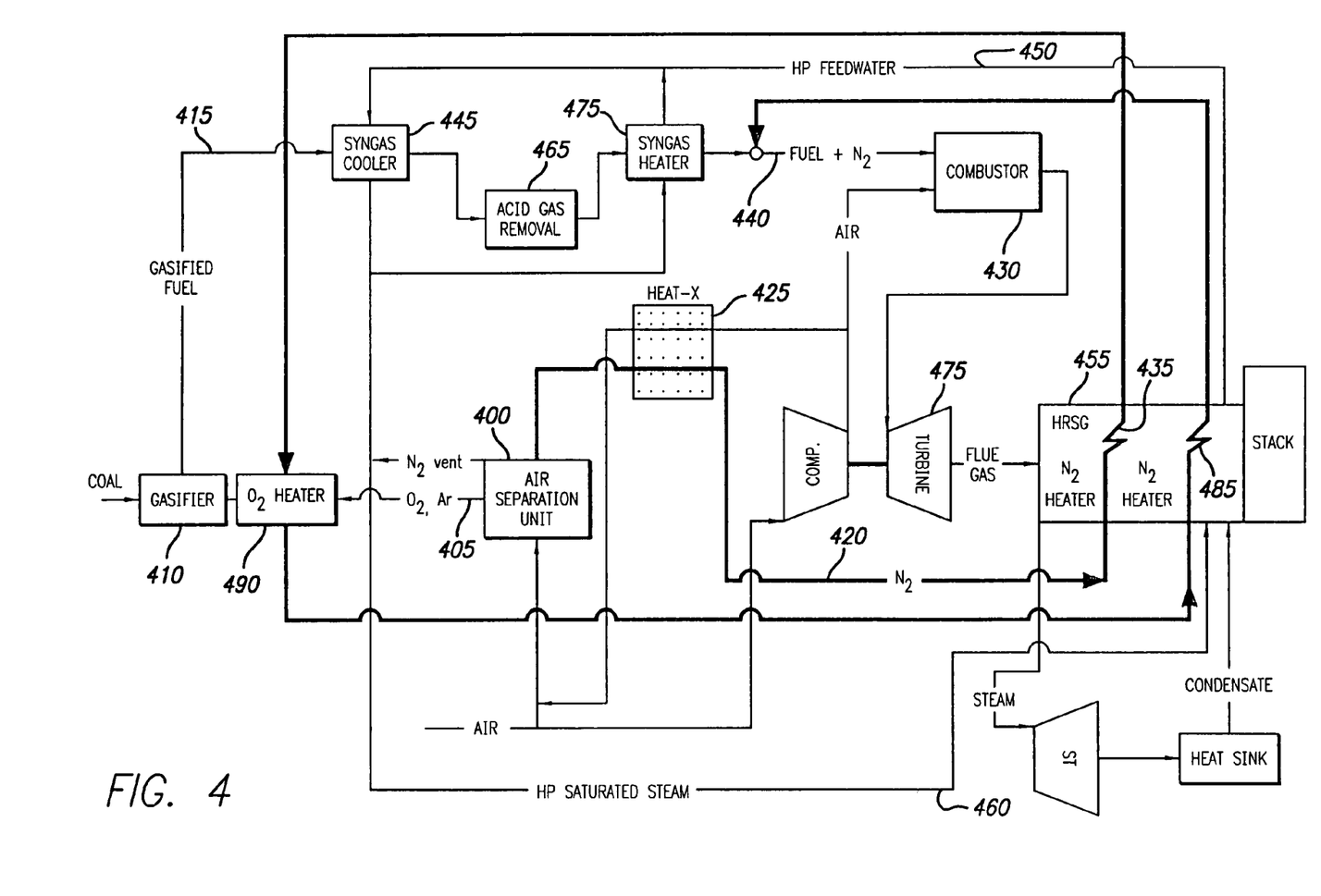
FIG. 4 shows a schematic of an IGCC system according to yet another embodiment of the present invention.

FIG. 4 provides a schematic of this embodiment. As shown, the ASU 400 includes an oxygen gas product stream 405 that may be sent to the gasifier 410 for use in forming the syngas product stream 415. The nitrogen product gas stream 420 from the ASU 400 may then be passed through a heat exchanger 425 to heat the nitrogen gas 420. Instead of then being mixed with the syngas just prior to being fed into the combustor 430, this embodiment diverts all or a part of the nitrogen gas stream 420 to a first nitrogen heater 435, which is located in the HRSG 455, wherein heat from the turbine 475 may be transferred to the nitrogen gas 420. The heated nitrogen gas can then be passed through an oxygen gas heat exchanger 490 to increase the temperature of oxygen gas stream 405 entering the gasifier 410. The nitrogen gas stream 420 may then be sent to a second nitrogen heater 485 within the HRSG 455 and then mixed with the heated syngas to form the fuel mixture 440 that then enters the combustor 430. This embodiment may include a syngas cooler 445, which uses feedwater 450 from the HRSG 455 to form steam 460 that may be used to generate power in the HRSG 455; an acid gas removal stage 465; and a syngas heater 470. Combustion products from the combustor 430 may be sent to gas turbine 475 to produce power, and since the temperature of the fuel mixture 440 is higher, the temperature of the combustion products is higher, thereby producing more power in the turbine. And, since the temperature of the oxygen gas stream 405 is higher, greater amounts of syngas 415 may be generated in the gasifier 410.

In still another embodiment, instead of using a product gas from the ASU, heat, in the form of steam, may be transferred upstream, such as through the use of steam. In one embodiment, flue gas energy may be used to generate high pressure superheated steam in the HRSG. This steam is routed to a heat exchanger where it transfers heat to one or more of the syngas, the diluent nitrogen, and/or the mixed fuel stream. The steam may then be sent from the heat exchangers and returned to the HRSG to be reheated.

Figure 5:
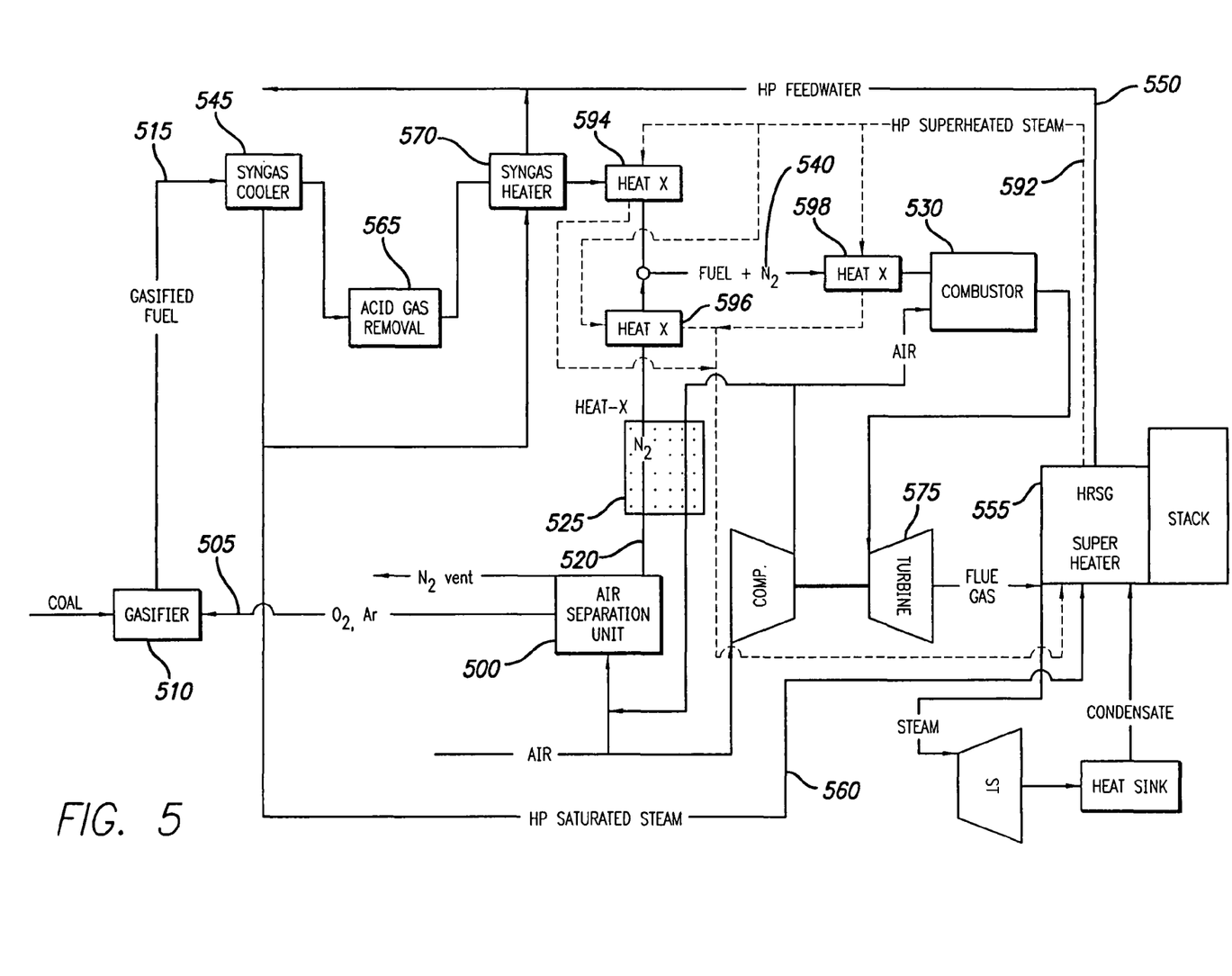
FIG. 5 shows a schematic of an IGCC system according to still another embodiment of the present invention.

FIG. 5 provides a schematic of this embodiment. As shown, the ASU 500 includes an oxygen gas product stream 505 that may be sent to the gasifier 510 for use in forming the syngas product stream 515. The nitrogen product gas stream 520 from the ASU 500 may be passed through a heat exchanger 525 to heat the nitrogen gas 520. A superheated steam stream 592, which is formed using heat from the HRSG 555, may be used to heat one or more of the syngas (using heat exchanger 594), the diluent nitrogen (using heat exchanger 596), and/or the mixed fuel stream (using heat exchanger 598). In these embodiments, the resulting heated fuel mixture 540 then enters the combustor 530. Combustion products from the combustor 530 can be sent to the turbine 575 to produce power.

Alternatively, a combination of these heat exchangers, with the steam flowing either in parallel, as shown, or in series, that is, the steam leaving one heat exchanger enters another heat exchanger, may be used in alternative embodiments. In addition, FIG. 5 shows the steam leaving the heat exchanger returning to the HRSG; however, it may be routed to the gasifier as a feedstock, to a water-gas shift reactor or syngas saturator as a feed stock, to the steam turbine as a working fluid, or elsewhere in the IGCC plant. Lastly, the HRSG steam shown in FIG. 5 may be a High Pressure (HP) steam; however, it is possible that steam of a lower pressure could be used for this heating application. The use of lower pressure steam for gas turbine fuel heating could conceivably provide the steam turbine with steam at a better suited pressure level, and would result in lower cost heat exchangers due to the lower maximum allowable working pressures present.

In yet another embodiment, superheated steam generated in either the syngas cooler or HRSG heat exchangers, or a combination of both, is routed to an oxygen heat exchanger where heat is transferred to the ASU product oxygen stream prior to being used in the gasifier. The liquid stream, whether in form of saturated steam or condensed as water, may then be routed back to the HRSG.

Figure 6:
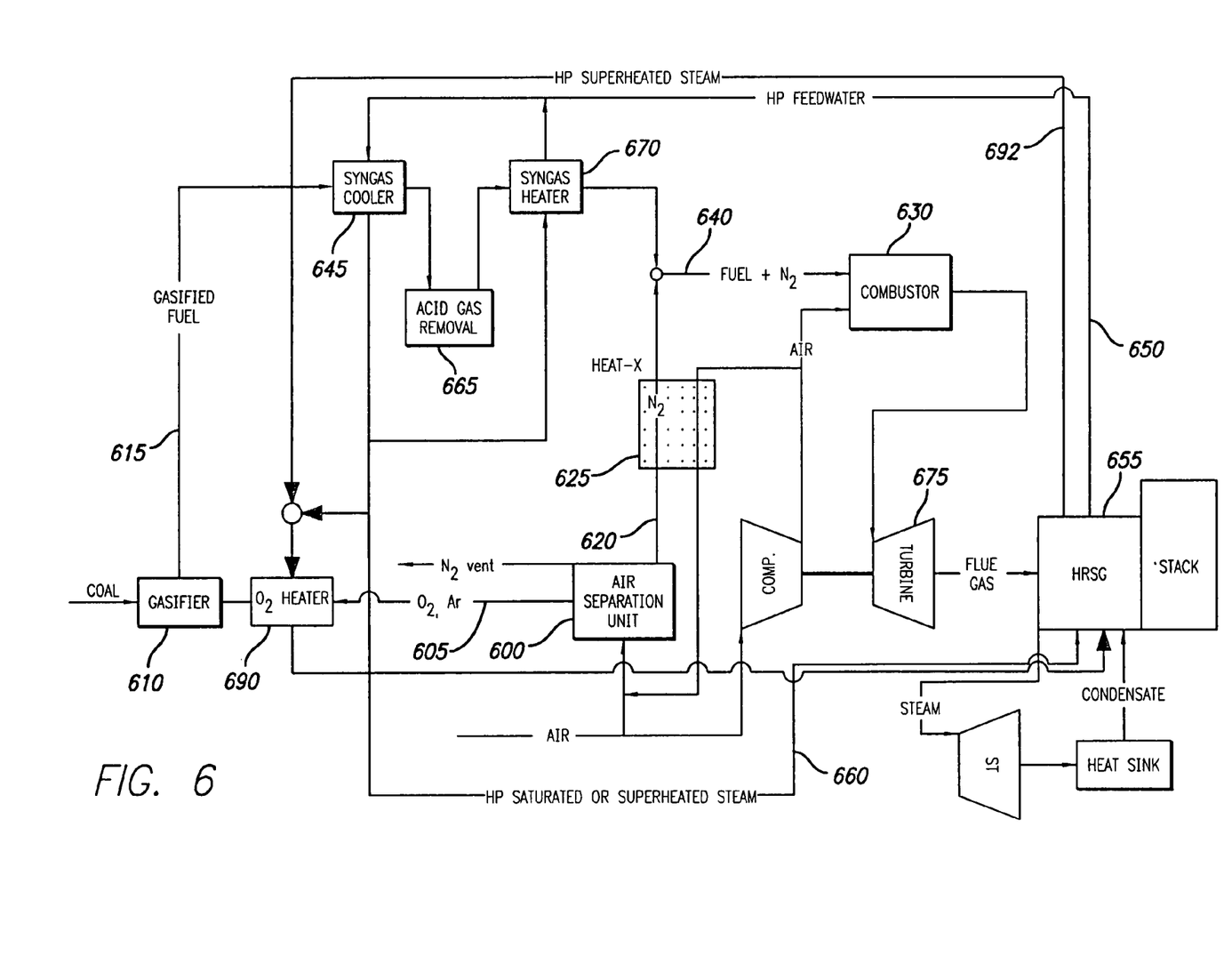
FIG. 6 shows a schematic of an IGCC system according to yet another embodiment of the present invention.

FIG. 6 provides a schematic of one aspect of this embodiment. As shown, the ASU 600 includes an oxygen gas product stream 605 that may be sent to the gasifier 610 for use in forming the syngas product stream 615. The nitrogen product gas stream 620 from the ASU 600 may be passed through a heat exchanger 625 to heat the nitrogen gas 620. The heated nitrogen stream can be combined with the fuel 615 to form a fuel mixture 640 that is fed to the combustor 630. A superheated steam stream 692, which is formed using heat from the HRSG 655, may be passed through an oxygen gas heat exchanger 690 to increase the temperature of oxygen gas stream 605 entering the gasifier 610. As previously discussed, by increasing the temperature of the oxygen, the efficiency of the gasifier 610 is increased, thereby increasing the amount of syngas generated per unit of coal used as feedstock. This embodiment may include a syngas cooler 645, which uses feedwater 650 from the HRSG 655 to form steam 660 that may be used to generate power in the HRSG; an acid gas removal stage 665; and a syngas heater 670. However, it is to be understood that the stream 660 may be used in lieu of steam stream 692 or in addition thereto. Combustion products from the combustor 630 can be directed to the turbine 675 to produce power.

The foregoing is provided for purposes of illustrating, explaining, and describing embodiments of this invention. Modifications and adaptations to these embodiments will be apparent to those skilled in the art and may be made without departing from the scope or spirit of this invention.

We claim:
1. A method for increasing efficiency of an integrated gasification combined cycle system comprising the steps of:
    producing a nitrogen gas product stream and an oxygen gas product stream using an air separation unit;
    feeding the oxygen gas product stream to a gasifier;

producing a syngas stream in the gasifier using the oxygen gas product stream and coal;

forming a fuel mixture stream using the syngas stream;

heating at least a portion of at least one of the oxygen gas product stream, the fuel mixture stream, or both using heat from a heat recovery steam generator;

heating the nitrogen gas product stream using heat from the heat recovery steam generator;

heating the syngas stream with nitrogen gas product stream heated in the heat recovery steam generator;

reheating the nitrogen gas product stream using heat from the heat recovery steam generator after heating the syngas stream with nitrogen gas product stream heated in the recovery steam generator; and mixing the heated nitrogen gas product stream with the syngas stream before being injected into a combustor.

2. The method of claim 1, wherein the heated nitrogen gas product stream heats the fuel mixture stream using a heat exchanger.

3. The method of claim 1, wherein the heated nitrogen gas product stream heats the oxygen gas product stream using a heat exchanger.

4. The method of claim 1, further comprising the step of forming a steam stream using heat from the heat recovery steam generator and further wherein the steam stream heats one or more of the syngas stream, the nitrogen gas product stream, or the mixed fuel stream.

5. The method of claim 1, further comprising the step of forming a steam stream using heat from the heat recovery steam generator and further wherein the steam stream heats the oxygen gas product stream.

* * * * *